United States Patent
Kimura et al.

[11] Patent Number: 5,850,897
[45] Date of Patent: *Dec. 22, 1998

[54] POWER TRANSMITTING APPARATUS

[75] Inventors: Katsumi Kimura; Michio Otsuka; Hiroshi Ogata; Kazuo Hattori; Masahiko Ebisui, all of Kanagawa-ken, Japan

[73] Assignee: Ebara Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 661,546

[22] Filed: Jun. 11, 1996

[30] Foreign Application Priority Data

Jun. 12, 1995 [JP] Japan ................................. 7-169215

[51] Int. Cl.$^6$ ............................. F16H 45/02; F16D 41/06
[52] U.S. Cl. ............................................. 192/3.3; 192/45
[58] Field of Search ................................ 192/3.28, 3.29, 192/3.3, 45

[56] References Cited

U.S. PATENT DOCUMENTS

| | | | |
|---|---|---|---|
| 1,955,879 | 4/1934 | Griswold | 192/48 |
| 3,557,921 | 1/1971 | Takada | 192/45 |
| 4,457,413 | 7/1984 | Hattori | 192/3.3 |
| 4,462,490 | 7/1984 | Hattori | 192/45 X |
| 4,613,022 | 9/1986 | Nishimura | 192/3.29 |
| 5,035,309 | 7/1991 | Takada | 192/45 |
| 5,067,601 | 11/1991 | Castens | 192/45 X |
| 5,328,012 | 7/1994 | Takata | 192/45 |
| 5,381,879 | 1/1995 | Takata | 192/45 |

FOREIGN PATENT DOCUMENTS

| | | |
|---|---|---|
| 609572 | 8/1926 | France . |
| 2 517 406 | 6/1983 | France . |
| 25 14 738 A1 | 10/1976 | Germany . |
| 31 44194 A1 | 7/1982 | Germany . |
| 49-15847 | 2/1974 | Japan . |
| 51-21093 | 6/1976 | Japan . |
| 52-60367 | 5/1977 | Japan . |
| 55-36852 | 9/1980 | Japan . |
| 5-149352 | 6/1993 | Japan . |
| 6-74259 | 3/1994 | Japan . |
| 6-330963 | 11/1994 | Japan . |
| 2 241 755 | 9/1991 | United Kingdom . |
| 93/00519 | 1/1993 | WIPO . |
| 93/00520 | 1/1993 | WIPO . |

OTHER PUBLICATIONS

THK LM System; Bear Clutch Series Safety Device; Catalog No. 145–1 published by THK Co., Ltd.; May 1993.
THK LM System; Bear Clutch Series Torque Absorber; Catalog No. 144–2 published by THK Co., Ltd., May 1993.
European Patent Office Communication with European Search Report and modified abstract for European Patent Application No. 96109322.6, dated Oct. 25, 1996.

*Primary Examiner*—Richard M. Lorence
*Attorney, Agent, or Firm*—Armstrong, Westerman, Hattori, McLeland & Naughton

[57] ABSTRACT

In a power transmitting apparatus for transmitting power from the driving side to the driven side using a fluid joint means, a rolling bearing clutch including an inner ring, an outer ring and a plurality of rollers interposed between track surfaces of the outer periphery of the inner ring and the inner periphery of the outer ring is disposed between the driving side and the driven side for performing ON/OFF operations by allowing the track surfaces of the inner ring and the outer ring to move near to each other or away from each other, and the driving side and the driven side are mechanically connected to each other without any fluid joint means interposed therebetween by shifting the bearing clutch to the ON position whereby a power transmitting efficiency can be improved without any slip loss by mechanically connecting the driving side to the driven side with a clutch mechanism.

8 Claims, 7 Drawing Sheets

POWER TRANSMITTING APPARATUS

BACKGROUND OF THE INVENTION

1. Field of the Art

The present invention relates to a power transmitting apparatus such as a fluid coupling, a torque converter or the like for transmitting power from a driving side to a driven side using fluid joint means. More particularly, the present invention relates to a power transmitting apparatus which can mechanically connect a driving side to a driven side with a clutch mechanism interposed therebetween and which assures that a power transmitting efficiency can be improved, without any slip loss, by equalizing the rotational speed of input from a prime mover to the rotational speed of a unit to be driven.

2. Prior Art

There is hitherto known a power transmitting apparatus such as a fluid coupling, a torque converter or the like for transmitting power from a driving shaft to a driven shaft via fluid filled in a casing where a pump impeller is connected to a driving shaft and a turbine impeller is connected to a driven shaft.

Description about the prior arts will be made below with respect to a power transmitting apparatus which is exemplified by a fluid coupling. When the rotational speed of a unit or a driven shaft is to be controlled by means of a fluid coupling, the rotational speed on a loading side or a driven shaft can be steplessly changed from a minimum rotational speed to a maximum rotational speed by shifting a scoop tube, or the minimum rotational speed or the maximum rotational speed of the driven shaft can be obtained by feeding working oil to the fluid coupling formed by an impeller, a runner and an impeller casing or by interrupting the feeding of the working oil to the fluid coupling.

In any case, when the driven shaft is rotated at a maximum rotational speed, the maximum rotational speed of the driven shaft is lower than that of the driving shaft or an input rotational speed of the prime mover such as a motor or an engine usually by about 3% due to slippage. This slippage can not be avoided when the rotational speed is controlled by a fluid coupling. Therefore, the fluid coupling efficiency is reduced due to slippage by a quantity corresponding to the slip percentage and the larger the transmitting power, the larger the loss of power.

The present invention was made to overcome the aforementioned problems and its object resides in providing a power transmitting apparatus which includes a clutch mechanism for mechanically connecting the driving side to the driven side and which assures that slip loss is eliminated by equalizing the rotational speed of input from a prime mover to the rotational speed of a unit to be driven, resulting in an improved power transmitting efficiency.

SUMMARY OF THE INVENTION

To accomplish the above object, the present invention provides a power transmitting apparatus for transmitting power from a driving side to a driven side using fluid joint means wherein the power transmitting apparatus is characterized in that a rolling bearing clutch including an inner ring, an outer ring and a plurality of rollers interposed between the outer periphery of the inner ring and the inner periphery of the outer ring is disposed between the driving side and the driven side, the rolling bearing clutch is ON/OFF operated by allowing the track surfaces of the inner ring and the outer ring to move close to each other or away from each other, whereby the driving side and the driven side can be mechanically connected to each other not via fluid joint means by shifting the rolling bearing clutch to the ON position.

The rolling bearing clutch may be constructed in such a way that a contact angle at least one of contact portions of each of the rollers with track surfaces of the outer ring and the inner ring as seen in the axial direction of the rollers is set to be larger than the frictional angle corresponding to the static frictional coefficient at the contact portion, whereby when the inner and outer rings are relatively rotated in the locking direction, the rollers can slide at the contact portions with the track surfaces of the inner ring and the outer ring.

The inner and outer rings are locked by imparting a thrust force to the inner or outer ring by way of thrusting means while the inner and outer rings are relatively rotated in the locking direction, whereby the rolling bearing clutch is shifted to the ON position. The rollers are allowed to slide at the contact portions on the track surfaces of the inner and outer rings by releasing the thrusting means from the thrust position, whereby the rolling bearing clutch is shifted to the OFF position.

Insteadly, the rolling bearing clutch may be constructed in such a way that the inner and outer rings are locked by imparting a thrust force to the inner or outer ring with the thrusting means while the inner and outer rings are relatively rotated in the rolling direction opposite to the locking direction, whereby the rolling bearing clutch is held in the ON position. The inner and outer rings are freely rotatable by releasing the thrusting means from the thrust position, whereby the rolling bearing clutch is held in the OFF position.

According to the present invention, a power transmitting apparatus such as a fluid coupling, a torque converter or the like for transmitting power from a driving side to a driven side makes it possible to mechanically connect the driving side to the driven side not via fluid joint means because the rolling bearing clutch is disposed between the driving side and the driven side. Thus, slip loss of the fluid joint means can be eliminated by equalizing the rotational speed of input from the prime mover to the rotational speed of a unit to be driven, resulting in improved power transmitting efficiency.

When the rolling bearing clutch is shifted to the ON position, the thrusting means may be driven by utilizing the centrifugal pressure of a fluid to displace the outer ring, whereby the track surfaces of the inner ring and the outer ring come close to each other. It should be noted that since the rolling bearing clutch is designed such that the track surfaces of the inner ring and the outer ring are moved away from each other when the thrusting force is released, the mechanical coupling between the driving side and the driven side can be immediately disconnected.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 3(a) to 3(c) are illustrative views of a rolling bearing clutch, wherein FIG. 3(a) is a partially sectioned perspective view of the rolling bearing clutch and FIGS. 3(b) and 3(c) are diagrams showing the operation of the rolling bearing clutch.

FIGS. 4(a) to 4(c) are illustrative views of a rolling bearing clutch shown in FIG. 1, wherein FIG. 4(a) is a schematic sectional view showing the relationship between the inner ring, the outer ring and the rollers, and FIGS. 4(b) and 4(c) are diagrams showing the relationship between the rollers and the track surfaces.

FIGS. 5(a) to 5(c) are illustrative views of track surfaces of the rolling bearing clutch, wherein FIG. 5(a) is a view showing track surfaces of the inner ring and the outer ring, FIG. 5(b) is a view showing the disposition of the rollers relative the center axis of the inner and outer rings, and FIG. 5(c) is a diagram showing the relationship between the track surfaces, a socket angle of the track surface, a twist angle of the rollers and a wedge angle of the rollers.

FIGS. 6(a) to 6(c) are illustrative views for explaining the wedge angle of rollers, wherein FIG. 6(a) is a view showing a screw thread of a taper screw, FIG. 6(b) is a view showing spirally sectioned inner and outer rings of the rolling bearing clutch, and FIG. 6(c) is a schematic view showing the relationship between the roller and the track surfaces of the inner and outer rings.

PREFERRED EMBODIMENTS OF THE INVENTION

The present invention will now be described in detail hereinafter with reference to the accompanying drawings which illustrate preferred embodiments thereof. In these embodiments, description will be made on the power transmitting apparatus exemplified by a fluid coupling.

Figure 1:
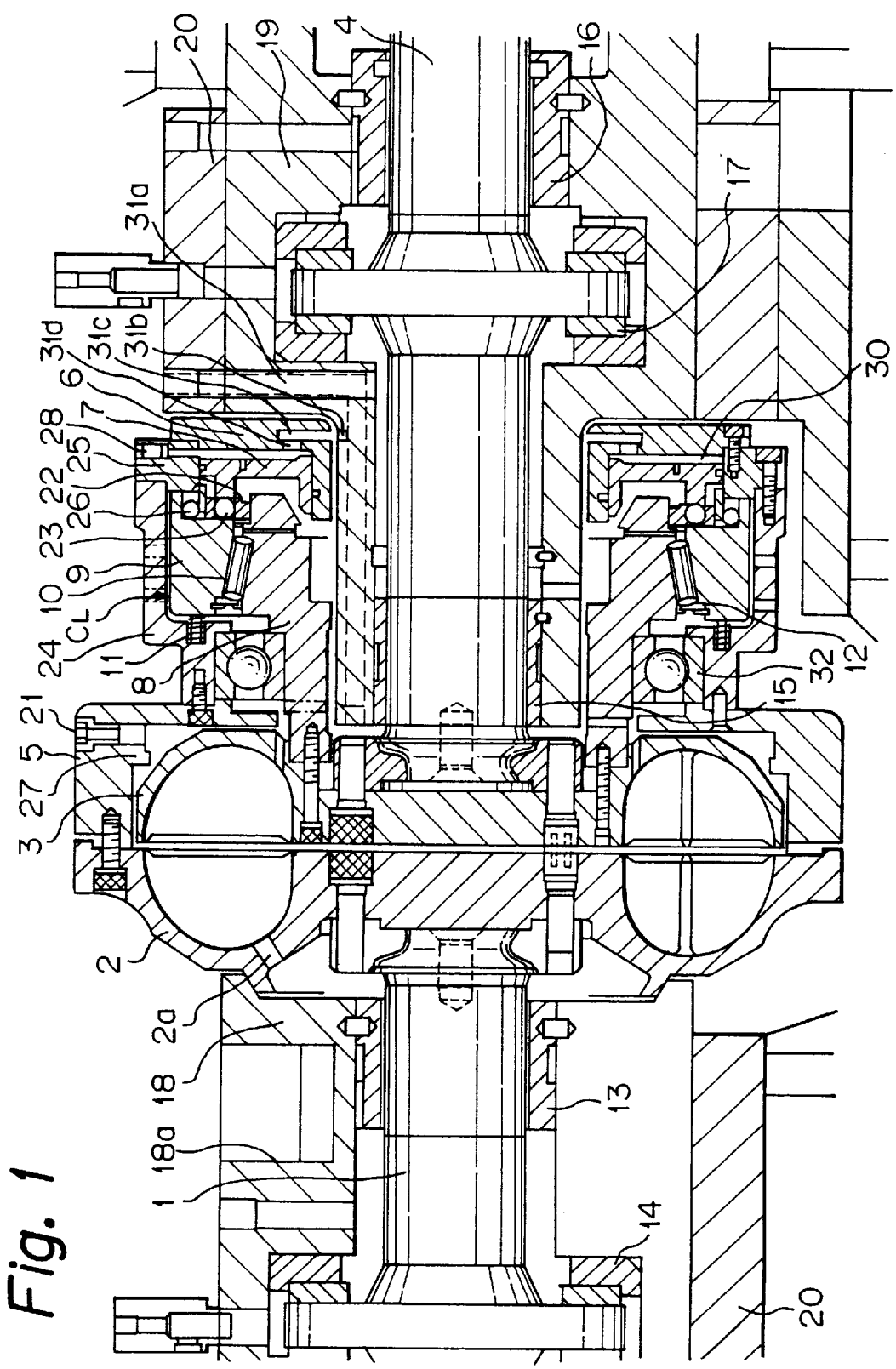
FIG. 1 is a sectional view which shows an embodiment of a power transmitting apparatus according to the present invention.

FIG. 1 is a sectional view which shows the entire structure of the fluid coupling. In FIG. 1 reference numeral 1 denotes a driving shaft, and driven shaft 4 is arranged adjacent to the driving shaft 1. The driving shaft 1 is rotatably supported in a bearing metal sleeve 13 disposed in a bearing casing 18, whereas the driven shaft 4 is rotatably supported in a bearing metal sleeves 15, 16 disposed in a bearing casing 19. The bearing casings 18 and 19 are held in position by a bearing casing retainer 20.

An impeller 2 is connected to the driving shaft 1, and a runner 3 is connected to the driven shaft 4. An impeller casing 5 is fixed to the impeller 2, and an outer annulus 24 is fixed to the impeller casing 5. And, an outer sleeve 25 is attached to the outer annulus 24, and an inner annulus 6 is attached to the outer sleeve 25.

A rolling bearing clutch $C_L$ is disposed in the space surrounded by the impeller casing 5, the outer annulus 24 and the inner annulus 6. The rolling bearing clutch $C_L$ is constituted of an inner ring 8, an outer ring 9, a plurality of cylindrical rollers 10 disposed between the inner and outer rings 8 and 9, and a retainer 12 for holding the plurality of rollers 10 at predetermined positions. The outer ring 9 is connected to the outer sleeve 25 via a ball spline mechanism 26, and the inner ring 8 is connected directly to the runner 3. The ball spline mechanism 26 allows the axial relative movement between the outer ring 9 and the outer sleeve 25 while prevents relative rotational movement therebetween. The cylindrical rollers 10 are arranged in the twisted position between the outer ring 9 and the inner ring 8 at a certain angle relative to the center axis of the inner and outer rings.

A space surrounded by the outer ring 25 and the inner annulus 6 constitutes a cylinder portion, and a piston 7 is axially displaceably disposed in the cylinder portion. A clutch ON/OFF working oil chamber 30 is defined between the inner surface of the cylinder portion and the piston 7 so that working oil is fed to the working oil chamber 30 via working oil feeding passages 31a, 31b, 31c and 31d each formed in the bearing casing 19 and the inner annulus 6. The working oil feeding passage 31a is hydraulically connected via a pipe to a hydraulic pump (as will be described later).

A plurality of balls 23 are interposed between the piston 7 and the outer ring 9 which allow the relative rotational movement therebetween holders 22 hold the plurality of balls 23 therein. In addition, a plurality of compression coil springs 11 are interposed between the outer ring 9 and the outer annulus 24, and the outer ring 9 is normally thrust in the rightward direction by the resilient force of the springs 11. A radial bearing 32 is interposed between the outer annulus 24 and the inner ring 8.

When working oil is fed to the working oil chamber 30, a certain intensity of centrifugal force is caused in the oil in the working oil chamber 30 depending on a quantity of oil fed to the working oil chamber 30, a rotational speed and so forth, whereby the piston 7 is thrust in the leftward direction and the inner annulus 6 is thrust in the rightward direction as seen in FIG. 1. Consequently, the force is exerted on the piston 7 which serves to thrust the outer ring 9 of the rolling bearing clutch $C_L$ in the leftward direction against the resilient force of the springs 11 and pull the inner ring 8 to the right-hand side as seen in FIG. 1. The pulling force is exerted on the inner ring 8 through the inner annulus 6, the outer sleeve 25, the outer annulus 24 and the radial bearing 32. Thus, the track surface of the outer ring 9 comes near to the track surface of the inner ring 8, causing the clutch to be shifted to the ON position (connected). On the contrary, when feeding of the working oil to the working oil chamber 30 is interrupted, the working oil which generates the centrifugal force is discharged outside of the working oil chamber 30 from a nozzle 28 which is communicated with the working oil chamber 30, whereby the rolling bearing clutch $C_L$ is brought in the OFF position (disconnected).

The thrust force of the driving shaft 1 is borne by a thrust bearing 14, and the thrust force of the driven shaft 4 is borne by a thrust bearing 17. In addition, a plurality of nozzles 21 are disposed along the outer periphery of the impeller casing 5, and a dam 27 for establishing the minimum rotational speed of a unit to be driven is formed on the inner wall surface of the impeller casing 5 on the inside of the position where each nozzle 21 is disposed.

Figure 2:
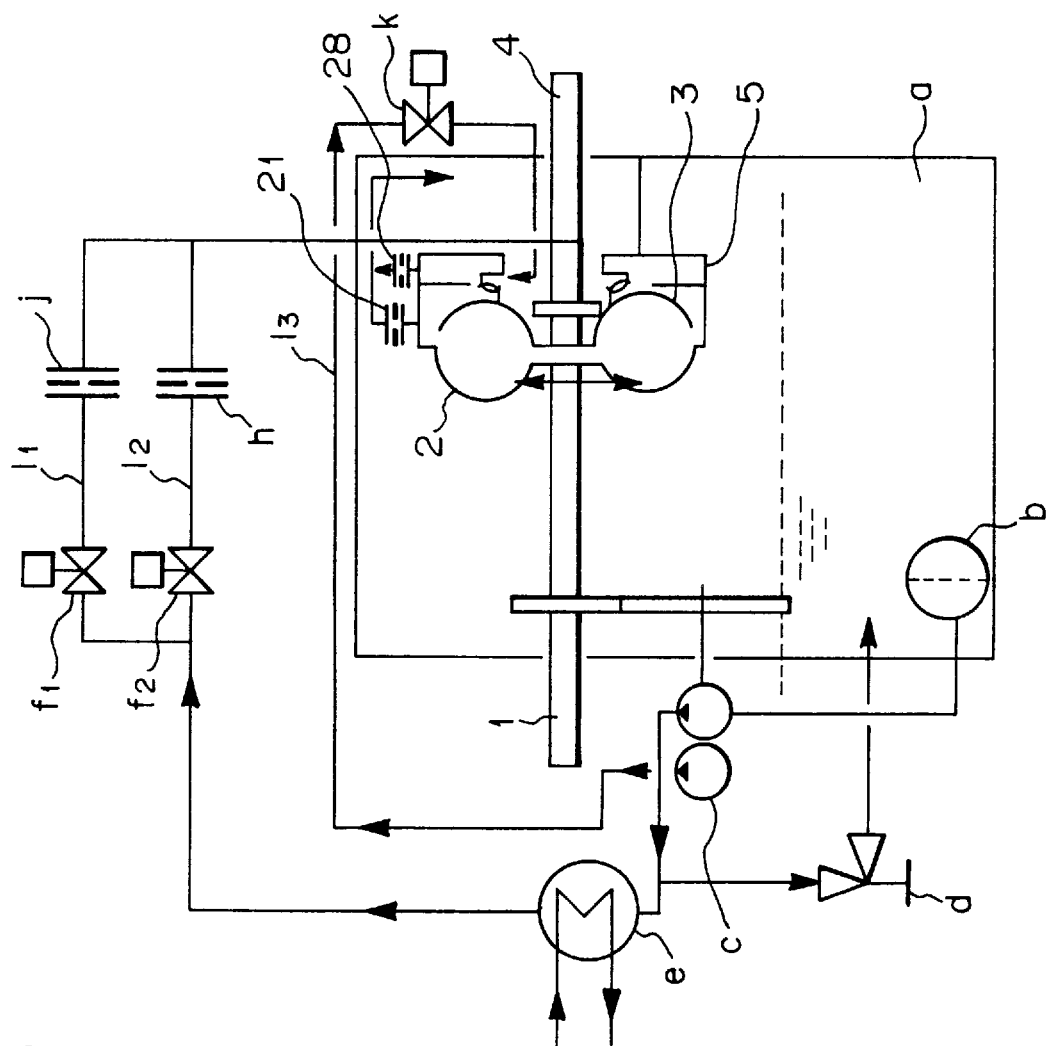
FIG. 2 is a circuit diagram of the working oil used in the power transmitting apparatus shown in FIG. 1.

A fluid coupling impeller working oil chamber is constituted of the impeller 2, the runner 3 and the impeller casing 5. The working oil is fed to the fluid coupling impeller working oil chamber via a working oil feeding passage 18a of the bearing casing 18 and an oil feeding hole 2a of the impeller 2. As shown in FIG. 2, the passage for feeding the working oil to the fluid coupling impeller working oil chamber comprises a passage $I_1$ which includes an opening/closing control valve $f_1$ adapted to quickly perform full opening and full closing and a maximum oil flow rate adjusting orifice j, and a passage $I_2$ which includes an opening/closing control valve $f_2$ disposed in parallel with the control valve $f_1$ to bypass the latter and a minimum oil flow rate adjusting orifice h. As an oil pump c is driven, the working oil is fed to the working oil chamber from an oil tank a via a strainer b through the passage $I_1$ or $I_2$, the oil feeding passage 18a of the bearing casing 18 on the driving side and the oil feeding hole 2a of the impeller 2. The working oil in the working oil chamber is discharged to the outside via the nozzles 21. As desired, a hydraulic pressure adjusting relief valve d and an oil cooler e are arranged.

A flow rate of working oil fed to the working oil chamber is determined by the maximum oil flow rate adjusting orifice j when the control valve $f_1$ is fully opened, and a minimum flow rate is determined by the minimum oil flow rate adjusting orifice h when the control valve $f_1$ is fully closed and the control valve $f_2$ is fully opened. Thus, the rotational speed of the unit is driven at a maximum rotational speed when the control valve $f_1$ is fully opened, and it is driven at a minimum rotational speed when the control valve $f_1$ is fully closed and the control valve $f_2$ is fully opened. On the other hand, the feeding of the working oil to the clutch ON/OFF working oil chamber 30 is achieved by the oil pump c through a passage $I_3$, a control valve k and communication passages 31a to 31d (see FIG. 1).

Next, a rolling bearing clutch will be described below in detail.

Figure 3A:
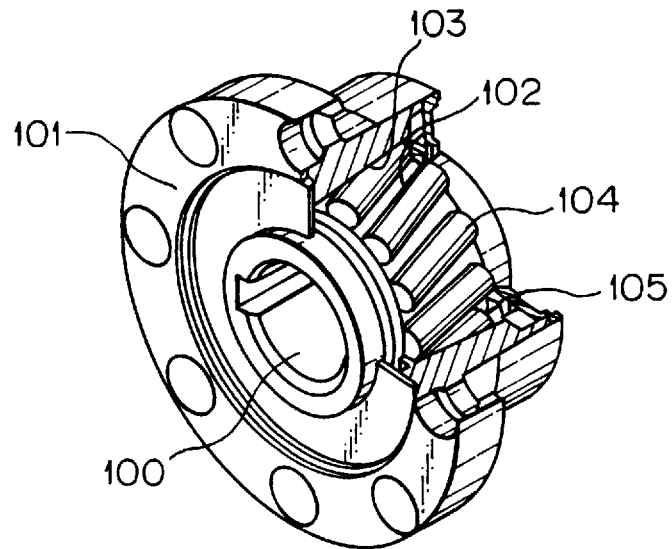
Figure 3B:
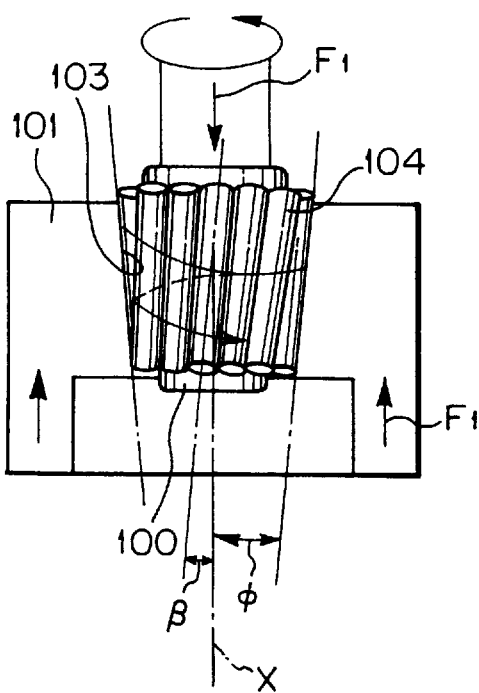

For example, the structure as shown in FIG. 3 is known as a rolling bearing clutch. Specifically, the rolling bearing clutch includes an inner ring 100, an outer ring 101 and a number of rollers 104 interposed between the outer periphery of the inner ring 100 and the inner periphery of the outer ring 101 as shown in FIG. 3(a). The rollers 104 are arranged with a predetermined twist angle β relative to a center axis X of the inner and outer rings 100 and 101 as shown in FIG. 3(b). A track surface 102 of the outer periphery of the inner ring 100 is convergent in the form of a substantially circular conical taper surface, and a track surface 103 of the inner periphery of the outer ring 101 is designed also in the form of a substantially circular conical taper surface corresponding to the track surface 102 of the inner ring 100. More precisely, since the track surfaces 102 and 103 are under a condition that the rollers 104 come into line contact with them, they respectively assume a single hyperboloid contour that is a locus which is scribed by turning the rollers 104 about the center axis X. The track surfaces 102 and 103 of the inner and outer rings 100 and 101 are inclined at a predetermined socket angle φ relative to the center axis X.

The rollers 104 come into contact with the track surfaces 102 and 103 of the inner and outer rings 100 and 101 with a predetermined twist angle β so that as the inner and outer rings 100 and 101 are rotated, the rollers 104 spirally roll between the inner and outer rings 100 and 101.

As shown in FIG. 3(b), when the inner ring 100 is rotated in such a direction that it is squeezed or advanced in the outer ring 101, a clutch component F1 which serves to allow the inner ring 100 and the outer ring 101 to move near to each other in the axial direction due to the rolling of the rollers 104 appears so that the rollers 104 between the inner ring 100 and the outer ring 101 are brought into a locked position, enabling torque to be transmitted.

Figure 3C:
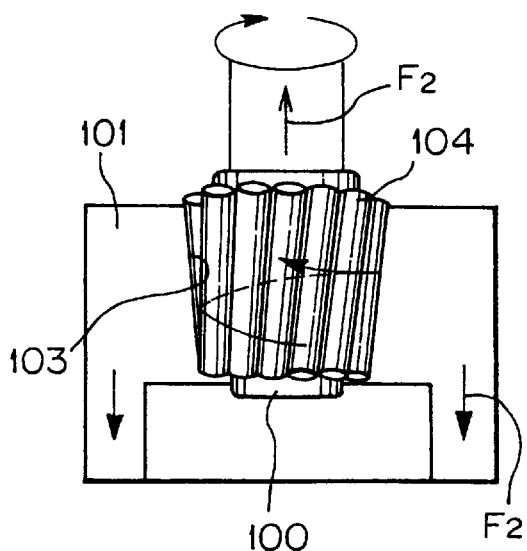

On the other hand, when the inner ring 100 is rotated in the reverse direction as shown in FIG. 3(c), a component F2 which serves to allow the inner and outer rings 100 and 101 to be parted away from each other appears so that the rollers 104 can rotate freely.

The known rolling bearing clutch explained above is utilized as a one-way clutch which transmits torque in one direction and freely rotates in the other direction by utilizing the aforementioned characteristics. It should be noted that a plurality of preliminary pressure springs 105 for imparting light preliminary pressure between the inner ring 100 and the outer ring 101 are arranged between the inner ring 100 and the outer ring 101 so as to allow the rollers 104 to come into initial contact with the inner and outer rings 100 and 101.

Next, the relationship between the inner ring 8, the outer ring 9 and the rollers 10 in the rolling bearing clutch $C_L$ employed for the present invention will be described below in detail.

Figure 4B:
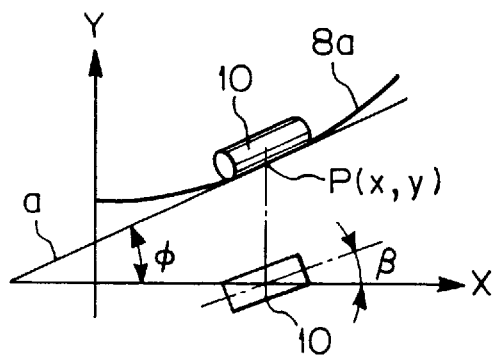
Figure 4A:
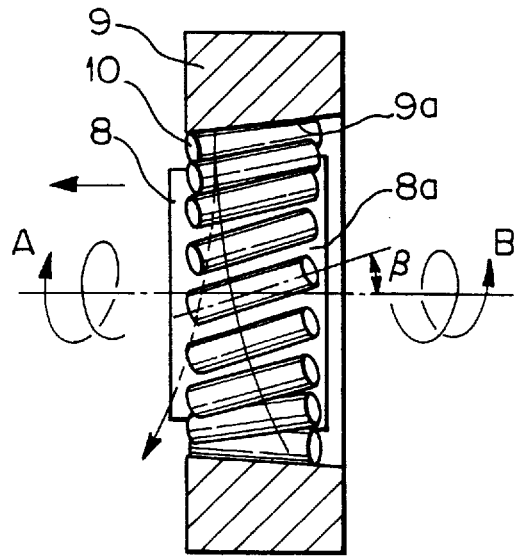
Figure 4C:
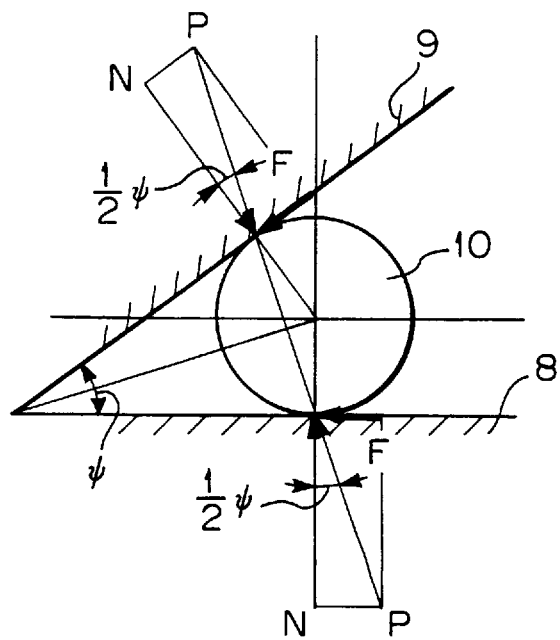

FIG. 4 is a diagrammatic illustration which shows the relationship between the inner ring 8, the outer ring 9 and the rollers 10, wherein FIG. 4(a) is a schematic sectional view which shows the inner ring 8, the outer ring 9 and the rollers 10, and FIGS. 4(b) and 4(c) are diagrammatical illustrations which show the relationship between the rollers 10 and the track surfaces. As shown in FIGS. 4(a) and 4(b), the rollers 10 are arranged with a predetermined twist angle β relative to the center axis X. A track surface 8a of the outer periphery of the inner ring 8 is contoured in the form of a substantially convergent circular conical taper surface, and also a track surface 9a of the inner periphery of the outer ring 9 is designed in the form of a substantially circular conical surface corresponding to the track surface 8a of the inner ring 8.

Figure 5A:
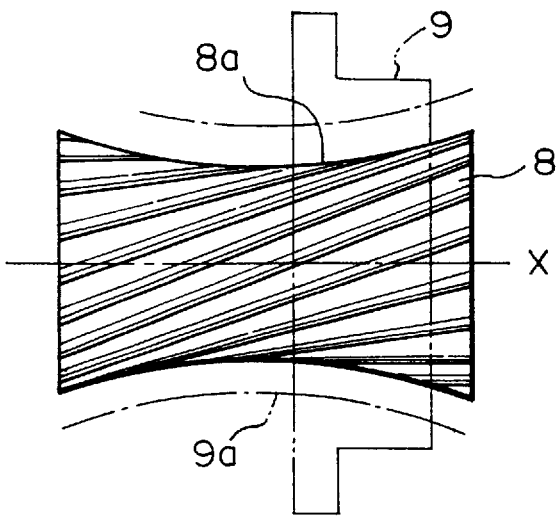
Figure 5B:
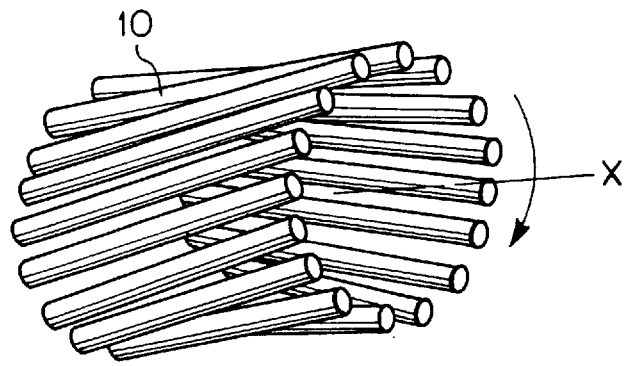

Here, the track surfaces 8a and 9a of the inner and outer rings 8 and 9 satisfactorily function only when the rollers 10 come into line contact with the track surfaces 8a and 9a, and, therefore, as shown in FIGS. 5(a) and 5(b), the track surfaces 8a and 9a are loci of the outer periphery and the inner periphery of the rollers 10 when the rollers 10 are turned about the center axis X, and thus, the track surfaces 8a and 9a respectively exhibit a hyperboloid contour.

Figure 5C:
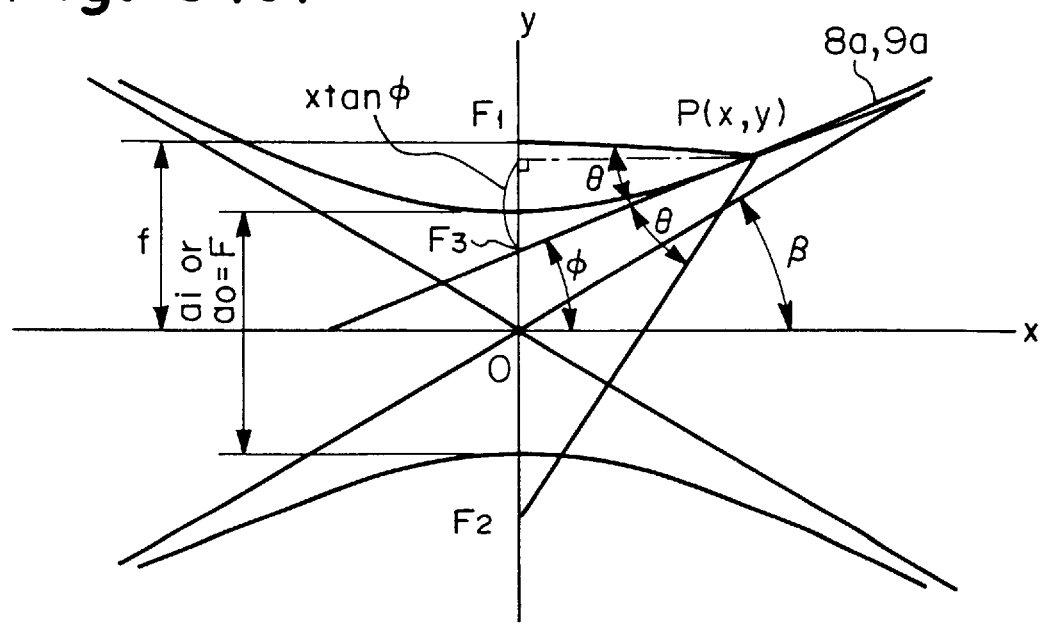

As shown in FIGS. 4(b) and 5(c), the track surfaces 8a and 9a of the inner and outer rings 8 and 9 are inclined with a predetermined socket angle φ relative to the center axis X. As shown in FIG. 4(b), the socket angle φ is an angle defined by the center axis X and a tangential line a extending at a roller contact point P(x, y) located on the track sectional plane that exhibits a hyperbola sectioned by a plane extending through the center axis line X of the inner ring 8 and the outer ring 9.

The rollers 10 are retained by the retainer 12 in the equally spaced relationship. The twist angle β of each roller 10 is not maintained by the retainer 12 but is automatically maintained by the hyperboloid contour of the track surfaces 8a and 9a of the inner and outer rings 8 and 9. The retainer 12 serves to hold the rollers 10 to prevent them from being scattered away when the inner and outer rings 8 and 9 are disassembled.

Next, the squeeze-in angle ψ will be described below with reference to FIG. 6.

Figure 6A:
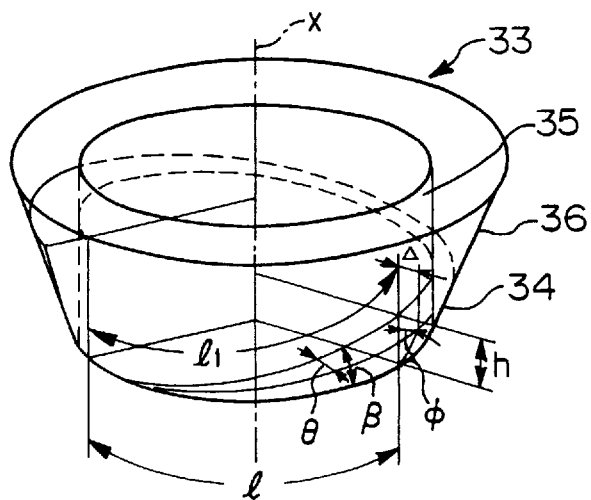

FIG. 6(a) is a diagrammatic illustration which shows a taper screw. As shown in the drawing, a screw thread 34 of the taper screw 33 is spirally wound around an imaginary cylindrical surface 35 with the predetermined lead angle β, and at the same time, it is located on the outer periphery of a circular cone 36 of which diameter is upwardly increased with the predetermined socket angle φ relative to the center axis X. Accordingly, the outer diameter of the screw thread 34 exhibits a wedge-shaped contour which gradually enlarges with a predetermined angle θ as it goes upwardly relative to the imaginary cylindrical surface 35. This angle θ is called as a rolling wedge angle.

This rolling wedge angle θ is an increasing or decreasing angle which increases or decreases as a male thread and a female thread are twisted in the case of a taper screw. However, when the male thread is screwed into the female thread, a sum of both the rolling wedge angles becomes an actual wedge angle.

This wedge angle is defined as a squeeze-in angle ψ.

In the case of the rolling bearing clutch $C_L$ of the invention, since each roller 10 interposed between the inner ring 8 and the outer ring 9 has a twist angle β, when the inner ring 8 and the outer ring 9 are rotated via the rollers 10, the inner ring is screwed into the outer ring 9 in one direction of rolling of the rollers 10 as if there are screws, and the rollers 10 are squeezed between the track surfaces 8a and 9a of the inner ring 8 and the outer ring 9, whereby entirely the same relationship as in the taper screw 33 is established.

Figure 6B:
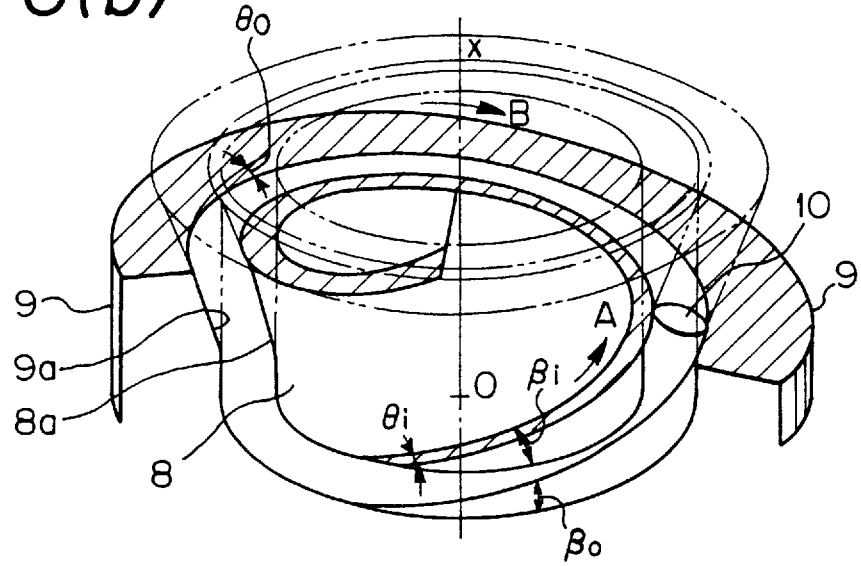

FIG. 6(b) shows a schematic view which spirally sections the inner and outer rings 8 and 9 of the rolling bearing clutch 1 in the direction of rolling of the rollers 10. As shown in the drawing, the track surface 8a on the inner ring 8 is inclined in such a way that it is gradually increased in diameter with a rolling wedge angle θi in one spiral direction (arrow A), while the track surface 9a of the outer ring 9 is inclined in such a way that it is gradually decreased in diameter with a wedge angle θo in the other spiral direction (arrow B).

Figure 6C:
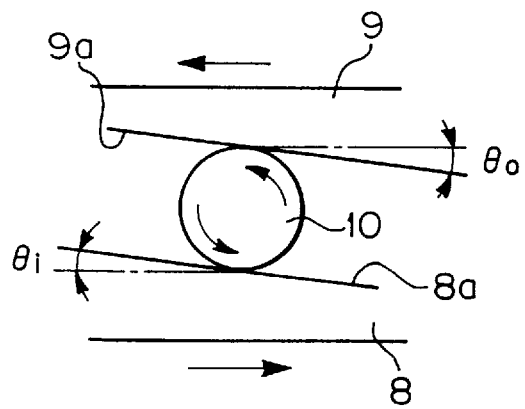

FIG. 6(c) is a schematic view that the roller 10 interposed between the track surfaces 8a and 9a is viewed in the axial direction. When the inner ring 8 and the outer ring 9 are moved in such a direction that the distance between the track surfaces 8a and 9a of the inner ring 8 and the outer ring 9 is narrowed, the roller 10 is squeezed therebetween. Since the squeezing of the roller 10 is affected by both of the rolling wedge angle θi on the inner ring 8 and the rolling wedge angle θo on the outer ring 9, the resultant summed angle (θi+θo) is defined as a squeeze-in angle ψ.

In the conventional roller bearing clutch, when the roller 10 is locked as it rolls between the track surfaces 8a and 9a of the inner ring 8 and the outer ring 9, a slippage should not be caused at the contact portions between the roller 10 and the track surfaces 8a and 9a.

However, in the present invention, slippage is caused at the contact portions between the roller 10 and the track surfaces 8a and 9a as they rotate in the locking direction in order to prevent the roller 10 from being squeezed therebetween. This condition is established by the fact that at least one of the rolling wedge angles θi and θo at the contact portions between the roller 10 and the track surfaces 8a and 9a is made larger than frictional angles λi and λo corresponding to static frictional coefficients μsi and μso at the contact portions.

Here, the frictional angle λ is an angle at which an article starts to slip in the case that the article is placed on a flat surface and then the latter is gradually inclined, where equations of $\tan \lambda i = \mu si$ and $\tan \lambda o = \mu so$ are established.

Since any squeezing-in does not occur at the contact point of the roller 10 when there is a slippage at least at one of the contact portions on the inner ring 8 and the outer ring 9, an inequality of θi>λi or θo>λo should be established. It of course is obvious that inequalities of θi>λi and θo>λo may be established. In other words, at least one of two conditions of $\tan \theta i > \mu si$ and $\tan \theta o > \mu so$ should be established.

FIG. 4(c) represents a squeeze-in angle ψ which is defined as a summed angle (θi+θo) of θi and θo.

Since it is assumed that the inner and outer rings 8 and 9 are made of a same material, the static frictional coefficients at the contact portions between the roller 10 and both the track surfaces 8a and 9a are equal to each other and the rolling contact angles θi and θo are substantially equal to each other, the squeeze-in angle (ψ) may be determined such that the relationship represented by the inequality of $\tan (\psi/2) > \mu s$ is established. Even though the squeeze-in angle is determined in that way, there would be no practical problem. In the drawing, N denotes a resistant force applied to the roller 10 from the contact surface, F denotes a frictional force and P denoted a synthesized force.

However, it is in practically difficult to measure and form such a rolling contact angle θ and, therefore, the contact angle θ is determined in association with the relationship between the roller twist angle β and the socket angle ϕ.

The contact angle θ, the roller twist angle β and the socket angle ϕ have a geometrically constant relationship as shown in FIG. 5(c).

From the taper screw model shown in FIG. 6(a), the relationship represented by the following equation is established.

$$\tan \theta = \sin \beta \cdot \tan \phi$$

Namely, an equation of Δ=1 tanβ·tanϕ is given from the relationship h=1 tanβ and Δ=h tanϕ. Also, in FIG. 6, $l_1$=1/cosβ and $\tan \theta = \Delta/l_1$ is given. Thus, an equation of $\tan \theta = \cos \beta \cdot \tan \beta \cdot \tan \phi = \sin \beta \cdot \tan \phi$ is given.

Accordingly, it is sufficient for the roller twist angle β and the socket angle ϕ are determined in such a manner as to establish an inequality of $\sin \beta \cdot \tan \phi > \mu s$. The value μs could vary depending on the material employed for the inner ring 8, the outer ring 9 and the rollers 10, the lubricating condition or the like. In the case that μs is set about to 0.05, it is preferable that the roller twist angle β be set to 21° to 24° and the socket angle ϕ be set to 8° to 10°.

When the roller twist angle β is set to 21° or less, there readily occurs a locked state, and when the roller twist angle is set to 25° or more, rolling becomes difficult. When the socket angle ϕ is set to 8° or less, there readily occurs a locked state, and when the socket angle ϕ is in excess of 10°, there readily arises slippage, whereby the stability is deteriorated.

When sin β·tanϕ is calculated, in the case of β:24° and ϕ:8°, it amounts to about 0.057, in the case of β:21° and ϕ:10°, it amounts to about 0.063 and in the case of β:21° and ϕ:8°, it amounts to 0.0503. Thus, it is larger than the maximum static frictional coefficient μs and satisfies the sliding conditions. At this time, the squeeze-in angle ψ is represented by about (ψ/2)=3°.

On the contrary, in a conventional rolling bearing clutch, while the roller twist angle β is set to 15° to 18°, the socket angle ϕ is used within the range of 4° to 4.5°.

When sin β·tanϕ in the conventional case is calculated, in the case of β:15° and ϕ:4°, it amounts to about 0.018, in the case of β:18° and ϕ:4.5°, it amounts to about 0.024, and in the case of β:18° and ϕ:4°, it amounts to about 0.021, thus it is smaller than the maximum static frictional coefficient and provides locking conditions.

It of course is obvious that the roller twist angle β and the socket angle ϕ are relative values. Thus, it is sufficient that the roller twist angle β is conventionally set to 15° to 18° and the socket angle ϕ is correspondingly selected so that sin β·tanϕ is set to the range of 0.05 or more. On the contrary, it is sufficient that when the socket angle is set to the range of 4 to 4.5°, sin β·tanϕ lies within the range of 0.05 or more.

The present invention is applicable to the case where the roller twist angle β is set to a value other than the above-noted value, i.e., the range of 15° or less, the range of 18° to 21° or the range of 24° or more.

In addition, the present invention is applicable to the case that the socket angle ϕ is set to the range of 4° or less, the range of 4.5° to 8° or the range of 10° or more.

Although the maximum static frictional coefficient μ is set to about 0.05 in the example, it is possible to adjust the static frictional coefficient μ to assume a various value such as 0.1, 1.5 or the like. While the roller twist angle β and the socket angle ϕ are set to conventional angles, sliding conditions can be obtained by changing the maximum static frictional coefficient. Namely, even though the conventional roller twist angle is set to the range of 15° to 18° and the socket angle ϕ is set to the range of 4° to 4.5°, sliding conditions will be established if the maximum static frictional coefficient μs is set to be smaller than 0.02. The static frictional coefficient depends on the relative relationship between the static frictional coefficient μ and the rolling frictional angle θ or the squeeze-in angle ψ of the roller 10, and the static frictional coefficient is not restricted to 0.05.

As shown in FIG. 5(c), there is a geometrical constant relationship between the roller twist angle β and the socket angle φ.

The following relationship is given from FIG. 5(c).

Arithmetical formula 1

$$\tan\phi = \frac{x \cdot \tan^2\beta}{\sqrt{F^2 + x^2 \cdot \tan^2\beta}}$$

$$\tan\theta = \sin\beta \cdot \tan\phi = \sin\beta \cdot \frac{x \cdot \tan^2\beta}{\sqrt{F^2 + x^2 \cdot \tan^2\beta}}$$

In FIG. 5(c), the contour of the track surfaces 8a, 9a of the inner and outer rings 8, 9 is represented by the following equations.

$$y_i^2/a_i^2 - x_i^2/b_i^2 = 1$$
$$y_o^2/a_o^2 - x_o^2/b_o^2 = 1$$

In FIG. 5(c), $F_1$ and $F_2$ are forcul points of hyperbolic curves representing the track surfaces.

Here, since the squeeze-in angle ψ of the roller 10 is a sum of the rolling contact angles θi and θo, the following formula is derived from the formula (1) and the relationship ψ=θi+θo.

Arithmetical formula 2

$$\psi = \tan^{-1}\frac{(y_1 + y_o)X\tan^2\beta\sin\beta}{y_1 \cdot y_o - (X\tan^2\beta\sin\beta)^2}$$

F: arbitrary value given at the time of track designing
$y_1$: track radius of inner ring at X $(F_1^2 + X^2 \cdot \tan^2\beta)^{1/2}$
$y_o$: track radius of outer ring at X $(F_o^2 + X^2 \cdot \tan^2\beta)^{1/2}$
$F_1 = F - r$
$F_o = F + r$
r=radius of roller As shown in FIG. 5(c), the track sectional shape is determined by the frictional angle θ and the twist angle β. The socket angle φ is determined depending on which range of the track section is practically used as a track surface. Namely, it is determined by the X coordinates of the roller contact point P (x0 in the foregoing formula) and a value of preset F. The roller contact point is located at the central position as seen in the axial direction of the roller.

Next, operation of the fluid coupling constructed as above will be explained.

When the control valve $f_1$ and a control valve K are closed and the control valve $f_2$ in FIG. 2 is opened while the prime mover is rotated at a rated rotational speed, a specific flow rate of working oil is fed via a minimum oil flow rate adjusting orifice h to the fluid coupling impeller working oil chamber formed by an impeller 2, a runner 3 and an impeller casing 5, which causes the rotational speed of a unit to be driven at a minimum rotational speed. When the control valve $f_1$ is opened and the control valve k is closed, a fixed rate of working oil defined by a maximum oil flow rate adjusting orifice j is fed to the fluid coupling impeller working oil chamber so that the rotational speed of the unit is driven at a maximum rotational speed while including a slippage caused by the fluid coupling.

When the control valve k shown in FIG. 2 is opened while the rotational speed of the unit is driven at a maximum rotational speed inclusive of a slippage caused by the fluid coupling, the working oil is fed to the clutch ON/OFF working oil chamber 30 formed by an outer sleeve 25, an inner annulus 6 and a piston 7 so that pressure is caused by the centrifugal force in the working oil contained in the working chamber 30. The piston 7 is thus thrust in the leftward direction by the pressure, and the track surfaces of the outer ring 9 and the inner ring 8 move near to each other and the rolling bearing clutch $C_L$ is shifted to the ON position. Then, the rotational speed of the unit to be driven becomes a rotational speed coincident with the rotational speed on the driving side without including a slippage caused by the fluid coupling. At this time, the working oil continuously flows out from the nozzles 28 communicated with the working chamber 30 disposed in the outer sleeve 25. Thus, when the feeding of the working oil to the working oil chamber 30 is interrupted, the working oil in the working oil chamber 30 is discharged from the nozzles 28 by the centrifugal force and the piston 7 is released from the thrusting force. Thus, the rollers 10 start to slide at the contact portions with the track surfaces 8a and 9a of the inner ring 8 and the outer ring 9 so that only the outer ring 9 is rotated but the inner ring 8 is not rotated, whereby the rolling bearing clutch $C_L$ is immediately shifted to the OFF position.

It is possible that the rotational speed of the unit is shifted to the minimum rotational speed by performing reverse operations to the aforementioned ones after the rolling bearing clutch $C_L$ is shifted to the OFF position.

The centrifugal force Px for actuating the rolling bearing clutch $C_L$ is represented by the following formula.

$$Px = \gamma\omega^2(r^2 - r_x^2)/2g$$

Here, γ denotes a specific weight of the working oil, and ω denotes a rotational angular speed. When the working oil is fed by a flow rate $Q_o$, an oil film having an innermost peripheral radius $r_x$ and an outermost peripheral radius r is formed in the working oil chamber 30. The outermost peripheral radius r is determined by the outer peripheral wall of the working oil chamber 30. When the working oil feeding flow rate $Q_o$ is increased, $r_x$ is decreased, and when $Q_o$ is decreased, $r_x$ is increased. As is apparent from the above description, it is possible that necessary centrifugal pressure $P_x$ is established by controlling the working oil feeding flow rate $Q_o$.

Figure 7:
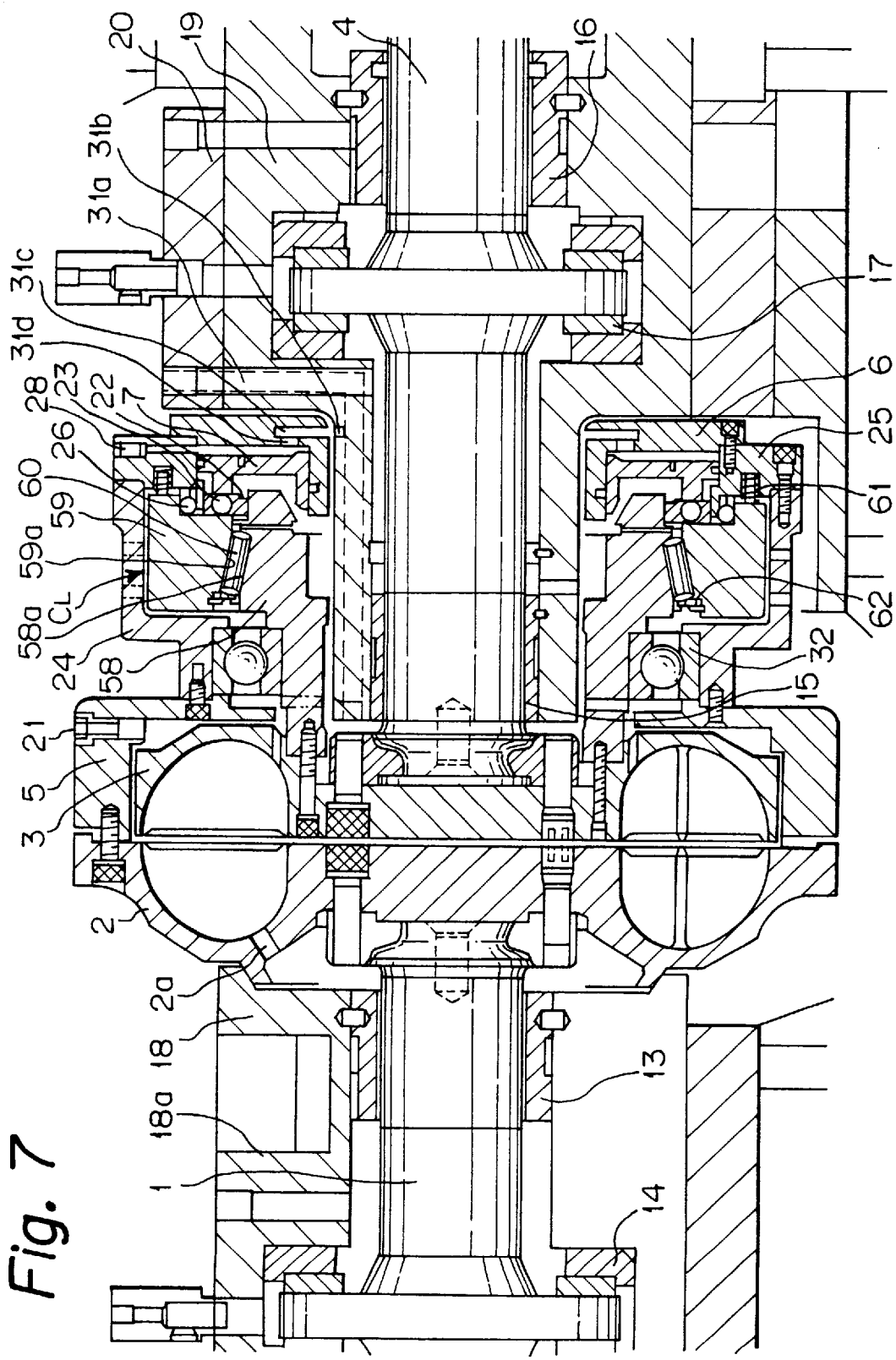
FIG. 7 is a sectional view showing another embodiment of the power transmitting apparatus according to the present invention.

Next, another embodiment of the present invention will be described below with reference to FIG. 7. In the embodiment shown in FIG. 7, the structure of the rolling bearing clutch $C_L$ is different from that of the embodiment shown in FIGS. 1 to 6. In this embodiment, the rolling bearing clutch $C_L$ is constructed such that the clutch is shifted to the ON position by imparting a thrust force to the outer ring by thrusting means while the inner and outer rings are relatively rotated in the opposite rolling direction to the locking direction, and it is used as a one-way clutch. The structure of the track surfaces of the inner and outer rings is entirely the same as the conventional one but in contrast thereto, an untwisting operation is not required. That is, in the conventional rolling bearing clutch, since the rollers squeeze between the inner and outer rings in clutch ON position, an untwisting operation is necessary to shift the clutch from the clutch ON position to the clutch OFF position.

The rolling bearing clutch $C_L$ includes an inner ring 58, an outer ring 59, a plurality of cylindrical rollers 60, and a retainer 62 for holding the rollers 60 at predetermined positions. The inner ring 58 is connected directly to the runner 3. The outer ring 59 is connected to the outer sleeve 25 via the ball spline mechanism 26, and the outer ring 59 is displaceable relative to the outer sleeve 25 in the axial direction while it is rotated together with the outer sleeve 25. In addition, the outer annulus 24 is fixed to the impeller casing 5. A plurality of preliminary pressure springs 61 are interposed between the opposing surfaces of the outer ring 59 and the outer sleeve 25 so that the outer ring 59 is thrust to the inner ring 58 in the axial direction so as to impart preliminary pressure to each roller 60. The structure of track surfaces 58$a$ and 59$a$ of the inner ring 58 and the outer ring 59 is entirely the same as that of the conventional ones having a hyperboloid contour and description on the structure of the track surface is herein omitted. Other structure is same as that in the embodiment shown in FIG. 1.

Next, operation of the fluid coupling constructed as above will be explained.

In this embodiment, the driving shaft 1 is relatively rotated only in the rolling direction opposite to the locking direction of the inner and outer rings of the rolling bearing clutch $C_L$. When the rolling bearing clutch $C_L$ is held in the OFF position, even though the driving shaft 1 is rotated, the outer ring 9 is rotated together with the outer annulus 24. However, as the rollers 10 roll, since a rolling component effective for parting the inner and outer rings 58 and 59 away from each other is caused, the rollers 10 are rotated freely without causing any rotation of the inner ring 58. When the control valve k is opened while the foregoing position is maintained, the working oil is fed to the working oil chamber 30 so that the pressure is caused in the working oil in the working oil chamber 30 by the centrifugal force. The piston 7 is thus thrust in the leftward direction by the pressure and the track surfaces of the outer ring 59 and the inner ring 58 come near to each other, causing the rolling bearing clutch $C_L$ to be shifted to the ON position so that the driving shaft 1 and the shaft 4 of a unit to be driven are mechanically coupled to each other. When the feeding of the working oil to the working oil chamber 30 is interrupted by closing the control valve k during torque loading, the working oil in the working oil chamber 30 is discharged from the nozzles 28 by the centrifugal force so that the piston 7 is released from the thrusting force. Thus, as the rollers 60 roll, a component effective for parting the inner and outer rings 58 and 59 away from each other appears, causing the rollers 10 to be rotated freely, whereby the rolling bearing clutch $C_L$ is immediately shifted to the OFF position.

When the fluid coupling shown in FIGS. 1 to 7 is applied to a pump for a descaling apparatus adapted to repeat high speed operation (loading operation) and low speed operation (no loading operation) for removing scale on the surface of a steel in a steel plant, operation can be performed at a minimum rotational speed at the time of no loading, and operation can be performed at the same rated rotational speed as that of a prime mover without including slip loss due to the use of fluid coupling at the time of loading. Consequently, a large saving in energy can be obtained by simple control.

In the embodiments shown in FIGS. 1 to 7, an example where the power transmitting apparatus of the present invention is applied to the fluid coupling is shown. However, the present invention should not be limited only to the fluid coupling but it can equally be applied to a torque converter.

As described above, according to the present invention, a power transmitting efficiency can be improved without any slip loss by mechanically connecting the driving side to the driven side. When the fluid coupling is applied to a pump for a descaling apparatus in a steel plant as one example of the present invention, operation can be performed at a minimum rotational speed at the time of no loading, and operation can be performed at the same rated rotational speed as that of a prime mover without including slip loss at the time of loading. Consequently, a large saving in energy can be obtained by simple control.

What is claimed is:

1. A power transmitting apparatus for transmitting power from a driving side to a driven side through at least one of a fluid joint means and a clutch mechanism, said clutch mechanism comprising:

a rolling bearing clutch including an inner ring, an outer ring and a plurality of rollers interposed between the outer periphery of said inner ring and the inner periphery of said outer ring, said rolling bearing clutch being disposed between the driving side and the driven side for performing ON/OFF operations by allowing the track surfaces of said inner ring and said outer ring to move near to each other or be away from each other, wherein the driving side and the driven side are mechanically connected to each other by shifting said rolling bearing clutch to an ON position; and thrusting means for shifting the track surfaces of said inner ring and said outer ring in said rolling bearing clutch to move near each other, wherein said rolling bearing clutch is constructed in such a way that said rollers are inclined with a predetermined twist angle ($\beta$) relative to the center axis of said inner and outer rings, each of the track surfaces of said inner ring and said outer ring exhibits a hyperboloid contour that is a revolving locus scribed when said rollers are turned about the center axis, and when said inner and outer rings are relatively rotated in one direction, said rolling bearing clutch is locked while being freely rotatable in the reverse direction, wherein a contact angle in at least one of contact portions of each of said rollers with track surfaces of said outer ring and said inner ring as seen in the axial direction of said rollers is set to be larger than the frictional angle corresponding to the static frictional coefficient at the contact portion, whereby when said inner and outer rings are relatively rotated in the locking direction, said rollers can slide at the contact portions with the track surfaces of said inner ring and said outer ring, and wherein said inner and outer rings are locked by thrusting said inner or outer ring with thrusting means while said inner ring and said outer ring are relatively rotated in said locking direction, whereby said rolling bearing clutch is shifted to the ON position, and said rollers are allowed to slide at the contact portions on the track surfaces of said inner ring and said outer ring by releasing said thrusting means from the thrust position, whereby said rolling bearing clutch is shifted to the OFF position.

2. The power transmitting apparatus as claimed in claim 1, wherein as a condition that said rollers slide at the contact portions on said inner ring and said outer ring while said inner and outer rings are relatively rotated in the locking direction, the relationship represented by an inequality of $\tan(\psi/2) > \mu s$ is established, wherein ($\psi$) is a squeezing-in angle defined between said rollers and track surfaces of said inner and outer rings as seen in the axial direction of said rollers, and ($\mu s$) a static frictional coefficient at the contact portion.

3. The power transmitting apparatus as claimed in claim 2, wherein a maximum static frictional coefficient is set to about 0.05.

4. The power transmitting apparatus as claimed in claim 3, wherein a socket angle ($\phi$) is defined by an angle between said center axis and the tangential line of said rollers with the track surface of said outer ring, a twist angle ($\beta$) of said rollers is set to the range of 21° to 24° and said socket angle ($\phi$) is set to 8° to 10°.

5. The power transmitting apparatus as claimed in claim 1, wherein said thrusting means comprises a piston engageable with said outer ring and means for applying fluid pressure to the pressure receiving surface of said piston.

6. The power transmitting apparatus as claimed in claim 5, wherein said means for applying fluid pressure comprises a working oil chamber defined between the pressure receiving surface of said piston and a cylinder portion adapted to receive said piston, a working oil feeding portion for feeding working oil to said working oil chamber, and a nozzle for discharging the working oil from said working oil chamber, said fluid pressure is caused by the centrifugal force applied to the working oil in said working oil chamber.

7. The power transmitting apparatus as claimed in claim 6, wherein a plurality of balls are interposed between said outer ring of said rolling bearing clutch and said piston.

8. A power transmitting apparatus for transmitting power from a driving side to a driven side through at least one of a fluid joint means and a clutch mechanism, said clutch mechanism comprising:

a rolling bearing clutch including an inner ring, an outer ring and a plurality of rollers interposed between the outer periphery of said inner ring and the inner periphery of said outer ring, said rolling bearing clutch being disposed between the driving side and the driven side for performing ON/OFF operations by allowing the track surfaces of said inner ring and said outer ring to move near to each other or be away from each other, wherein the driving side and the driven side are mechanically connected to each other by shifting said rolling bearing clutch to an ON position; and thrusting means for shifting the track surfaces of said inner ring and said outer ring in said rolling bearing clutch to move near to each other, wherein said rolling bearing clutch is constructed in such a way that said rollers are inclined with a predetermined twist angle ($\beta$) relative to the center axis of said inner and outer rings, each of the track surfaces of said inner ring and said outer ring exhibits a hyperboloid contour that is a revolving locus scribed when said rollers are turned about the center axis, and when said inner and outer rings are relatively rotated in one direction, said rolling bearing clutch is held in the locked position while it is freely rotatable in the opposite direction, and wherein said inner and outer rings are locked by thrusting said inner or outer ring with said thrusting means while said inner and outer rings are relatively rotated in the rolling direction opposite to the locking direction, whereby said rolling bearing clutch is held in the ON position, and said inner and outer rings are freely rotatable by releasing said thrusting means from the thrust position, whereby said rolling bearing clutch is held in the OFF position.

\* \* \* \* \*